US011393626B2

(12) United States Patent
Onishi et al.

(10) Patent No.: US 11,393,626 B2
(45) Date of Patent: Jul. 19, 2022

(54) MULTILAYER CERAMIC CAPACITOR AND METHOD OF MANUFACTURING MULTILAYER CERAMIC CAPACITOR (71) Applicant: Murata Manufacturing Co., Ltd., Nagaokakyo (JP)

(72) Inventors: Kosuke Onishi, Nagaokakyo (JP); Satoshi Muramatsu, Nagaokakyo (JP); Taisuke Kanzaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 27 days.

(21) Appl. No.: 16/830,314

(22) Filed: Mar. 26, 2020

(65) Prior Publication Data
US 2020/0312564 A1 Oct. 1, 2020

(30) Foreign Application Priority Data

Mar. 28, 2019 (JP) .............................. JP2019-064714
Dec. 26, 2019 (JP) .............................. JP2019-235641

(51) Int. Cl.
H01G 4/232 (2006.01)
H01G 4/012 (2006.01)
(Continued)

(52) U.S. Cl.
CPC ........... H01G 4/2325 (2013.01); H01G 4/012 (2013.01); H01G 4/30 (2013.01); H01G 4/0085 (2013.01);
(Continued)

(58) Field of Classification Search
CPC ........ H01G 4/2325; H01G 4/012; H01G 4/30; H01G 4/0085; H01G 4/1227;
(Continued)

(56) References Cited

U.S. PATENT DOCUMENTS 6,007,599 A 12/1999 Tamura et al.
2008/0112109 A1* 5/2008 Muto .................. C04B 35/4682
361/301.4

(Continued)

FOREIGN PATENT DOCUMENTS

JP 2017-168488 A 9/2017
KR 10-1998-0064121 A 10/1998
(Continued)

OTHER PUBLICATIONS

Official Communication issued in corresponding Korean Patent Application No. 10-2020-0036544, dated Mar. 16, 2021.

Primary Examiner — Michael P McFadden
(74) Attorney, Agent, or Firm — Keating & Bennett, LLP (57) ABSTRACT A multilayer ceramic capacitor includes a capacitive element including a stack of ceramic layers and internal electrodes, and external electrodes on a surface of the capacitive element. Each of the external electrodes includes a base electrode layer on the surface of the capacitive element and a Cu-plated electrode layer on a surface of the base electrode layer and including an edge portion facing the surface of the capacitive element. Sn is provided between the edge portion of the Cu-plated electrode layer and the surface of the capacitive element. On a surface of the Cu-plated electrode layer, at least one second plated electrode layer including an edge portion facing the surface of the capacitive element is provided.

11 Claims, 9 Drawing Sheets (51) Int. Cl.
  *H01G 4/30*   (2006.01)
  *H01G 4/008*  (2006.01)
  *H01G 4/12*   (2006.01)

(52) U.S. Cl.
  CPC ......... *H01G 4/1227* (2013.01); *H01G 4/1236* (2013.01)

(58) Field of Classification Search
  CPC ........ H01G 4/1236; H01G 4/12; H01G 4/248; H01G 4/1209; H01G 4/232
  See application file for complete search history.

(56) References Cited

U.S. PATENT DOCUMENTS

| | | | | |
|---|---|---|---|---|
| 2009/0323253 | A1* | 12/2009 | Kobayashi | H01G 4/232 361/301.4 |
| 2012/0188684 | A1* | 7/2012 | Akazawa | H01G 4/012 361/321.2 |
| 2013/0250480 | A1* | 9/2013 | Ahn | H01G 4/2325 361/321.2 |
| 2014/0049877 | A1* | 2/2014 | Suzuki | H01G 4/1245 361/321.4 |
| 2018/0025844 | A1* | 1/2018 | Sato | H01G 4/008 361/321.2 |
| 2018/0082789 | A1* | 3/2018 | Asano | H01G 4/232 |
| 2020/0082983 | A1* | 3/2020 | Kim | H01G 4/012 |

FOREIGN PATENT DOCUMENTS

| | | |
|---|---|---|
| KR | 10-2003-0027414 A | 4/2003 |
| KR | 10-2011-0028252 A | 3/2011 |
| KR | 10-2018-0011660 A | 2/2018 |
| KR | 10-1896286 B1 | 9/2018 |

\* cited by examiner

MULTILAYER CERAMIC CAPACITOR AND METHOD OF MANUFACTURING MULTILAYER CERAMIC CAPACITOR

CROSS REFERENCE TO RELATED APPLICATIONS

This application claims the benefit of priority to Japanese Patent Application No. 2019-064714 filed on Mar. 28, 2019 and Japanese Patent Application No. 2019-235641 filed on Dec. 26, 2019. The entire contents of these applications are hereby incorporated herein by reference.

BACKGROUND OF THE INVENTION

1. Field of the Invention

The present invention relates to a multilayer ceramic capacitor. More specifically, the present invention relates to a multilayer ceramic capacitor with an improved moisture resistance. Further, the present invention also relates to a method of manufacturing a multilayer ceramic capacitor that is suitable for manufacturing the multilayer ceramic capacitor according to the present invention.

2. Description of the Related Art

Typical multilayer ceramic capacitors include a capacitive element including a stack of a plurality of ceramic layers and a plurality of internal electrodes, and, on a surface of the capacitive element, external electrodes are formed. The internal electrodes extend to end surfaces and/or side surfaces of the capacitive element and are connected to the external electrodes. Each external electrode includes, for example, a base electrode layer formed by conductive paste application and firing, and a plated electrode layer formed on a surface of the base electrode layer. The plated electrode layer may include a plurality of layers, as needed.

For instance, Japanese Patent Laid-Open No. 2017-168488 discloses a multilayer ceramic capacitor including an external electrode that includes a base electrode layer mainly including Ni, a Cu-plated electrode layer formed on a surface of the base electrode layer, a Ni-plated electrode layer formed on a surface of the Cu-plated electrode layer, and an Sn-plated electrode layer formed on a surface of the Ni-plated electrode layer.

In the multilayer ceramic capacitor disclosed in Japanese Patent Laid-Open No. 2017-168488, the Cu-plated layer of the external electrode has a high moisture resistance and therefore has the function to reduce moisture penetration from outside into the external electrode.

It should be noted that the Cu-plated layer is formed on the surface of the base electrode layer by plating growth. Therefore, in ordinary cases, an edge portion of the Cu-plated layer is merely in contact with a surface of the capacitive element, not strongly joined to the surface of the capacitive element.

For this reason, in some cases where the Cu-plated layer is thin, for example, moisture penetrates from outside through a gap between the edge portion of the Cu-plated layer and the surface of the capacitive element into the external electrode and, moreover, moisture further penetrates through, for example, a gap between the base of the external electrode and the surface of the capacitive element to reach an internal electrode, causing degradation of properties of the multilayer ceramic capacitor.

For instance, in some cases, a surfactant is mixed in the plating solution used for formation of Sn-plated electrode layer and the plating solution (moisture) penetrates through a gap between the edge portion of the Cu-plated layer and the surface of the capacitive element into the external electrode, causing degradation of properties of the multilayer ceramic capacitor. In some other cases, after completion of manufacture of the multilayer ceramic capacitor, atmospheric moisture penetrates through a gap between the edge portion of the Cu-plated layer and the surface of the capacitive element into the external electrode, causing degradation of properties of the multilayer ceramic capacitor.

SUMMARY OF THE INVENTION

Preferred embodiments of the present invention provide multilayer ceramic capacitors each achieving an improved moisture resistance, and methods of manufacturing multilayer ceramic capacitors according to preferred embodiments of the present invention.

A multilayer ceramic capacitor according to a preferred embodiment of the present invention includes a capacitive element including a stack of a plurality of ceramic layers and a plurality of internal electrodes, and including a pair of main surfaces facing each other in a height direction, a pair of end surfaces facing each other in a length direction orthogonal or substantially orthogonal to the height direction, and a pair of side surfaces facing each other in a width direction orthogonal or substantially orthogonal to both the height direction and the length direction; and at least two external electrodes provided on a surface of the capacitive element, wherein each of the internal electrodes extends to the surface of the capacitive element at the end surfaces and/or the side surfaces and is connected to at least one of the external electrodes, each of the external electrodes includes a base electrode layer provided on the surface of the capacitive element, and a Cu-plated electrode layer provided on a surface of the base electrode layer and including an edge portion facing the surface of the capacitive element, and Sn is provided between the edge portion of the Cu-plated electrode layer and the surface of the capacitive element.

A method of manufacturing a multilayer ceramic capacitor according to a preferred embodiment of the present invention includes producing a plurality of ceramic green sheets; applying a conductive paste for forming an internal electrode to a main surface of at least some ceramic green sheets of the plurality of ceramic green sheets, the conductive paste being applied in a desired shape; stacking the plurality of ceramic green sheets to produce an unfired capacitive element as a single body; firing the unfired capacitive element to produce a capacitive element including a stack of a plurality of ceramic layers and a plurality of internal electrodes; forming a base electrode layer on a surface of the capacitive element; forming a Cu-plated electrode layer on a surface of the base electrode layer, the Cu-plated electrode layer including an edge portion facing the surface of the capacitive element; immersing the capacitive element in an Sn solution to impregnate Sn at least between the edge portion of the Cu-plated electrode layer and the surface of the capacitive element; and forming at least one second plated electrode layer on a surface of the Cu-plated electrode layer, the second plated electrode layer including an edge portion facing the surface of the capacitive element.

In each of the multilayer ceramic capacitors according to preferred embodiments of the present invention, Sn is provided between the edge portion of the Cu-plated electrode layer and the surface of the capacitive element, and, thus, moisture penetration through a gap between the edge portion of the Cu-plated layer and the surface of the capacitive element is reduced or prevented.

By using the methods of manufacturing multilayer ceramic capacitors according to preferred embodiments of the present invention, the multilayer ceramic capacitor according to preferred embodiments of the present invention can be easily manufactured with ease.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings.

The preferred embodiments are merely illustrative of the present invention, and the scope of the present invention will not be limited to the contents of the preferred embodiments. Features and elements of different preferred embodiments may be used in combination, and are also included within the scope of the present invention. The drawings are provided to help understanding the specification, and may be schematic, where the dimensional ratio of components and of component-to-component intervals may not agree with the dimensional ratio thereof described in the specification. Some components described in the specification may be omitted, or reduced in number, in the drawings.

First Preferred Embodiment

Figure 1:
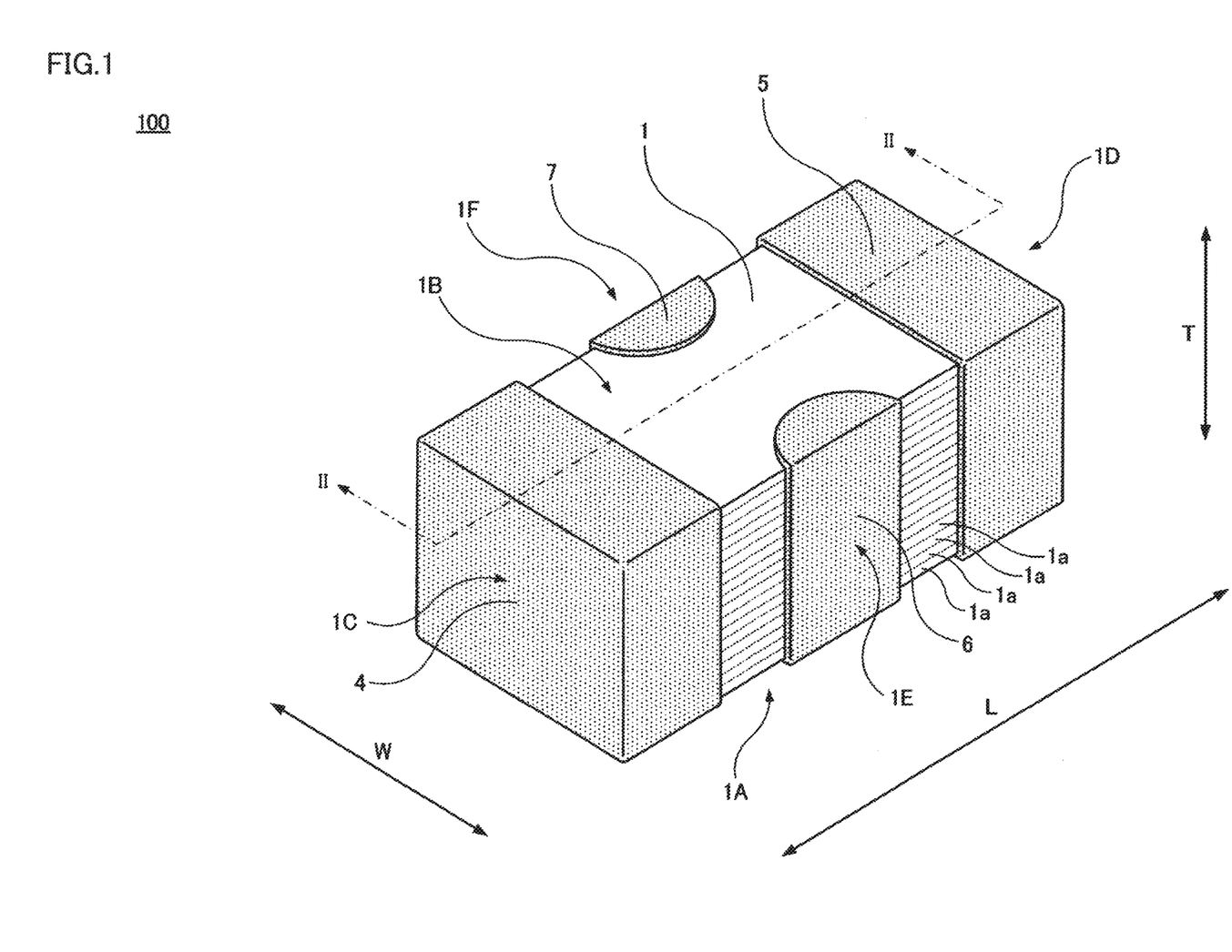
FIG. 1 is a perspective view of a multilayer ceramic capacitor 100 according to a first preferred embodiment of the present invention.
Figure 2:
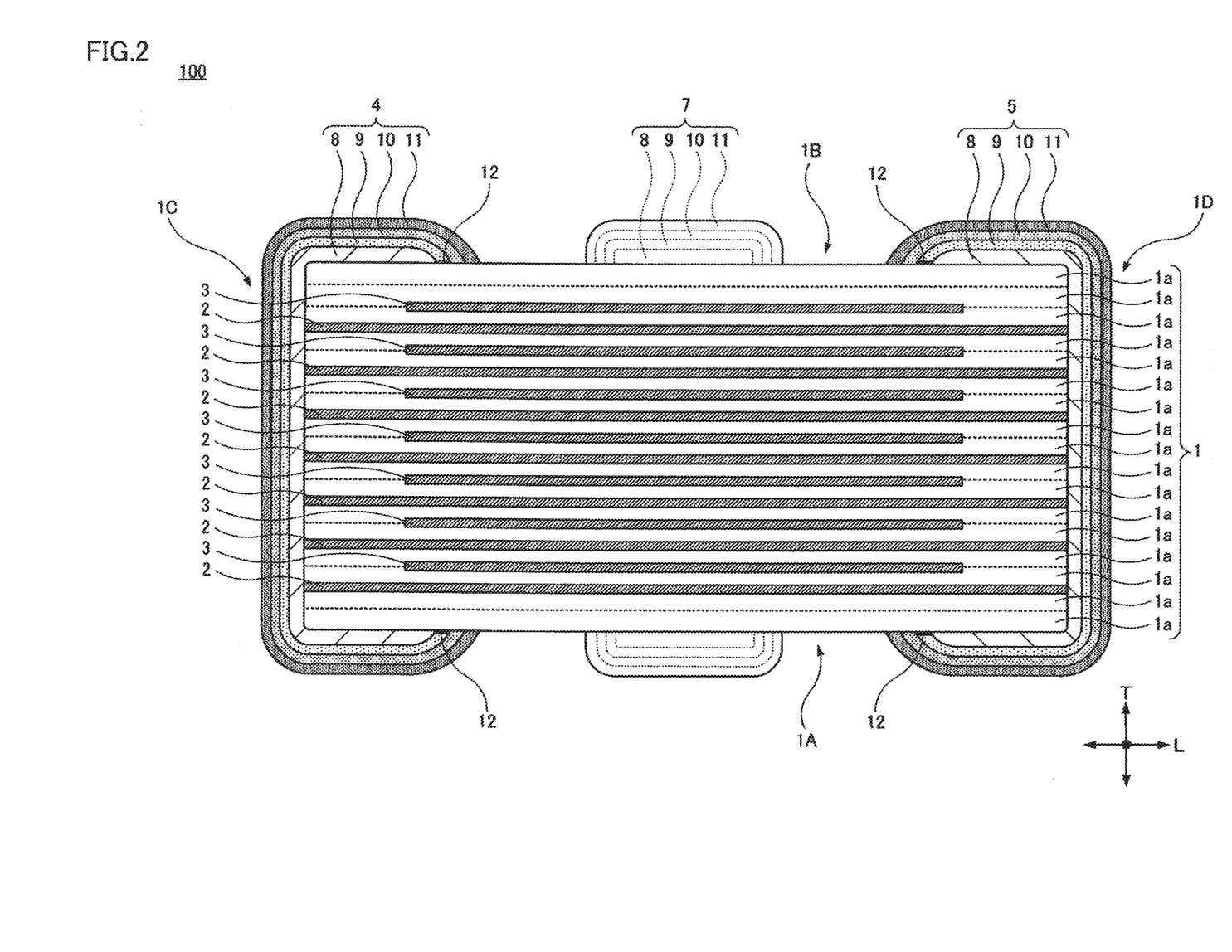
FIG. 2 is a sectional view of multilayer ceramic capacitor 100.
Figure 3:
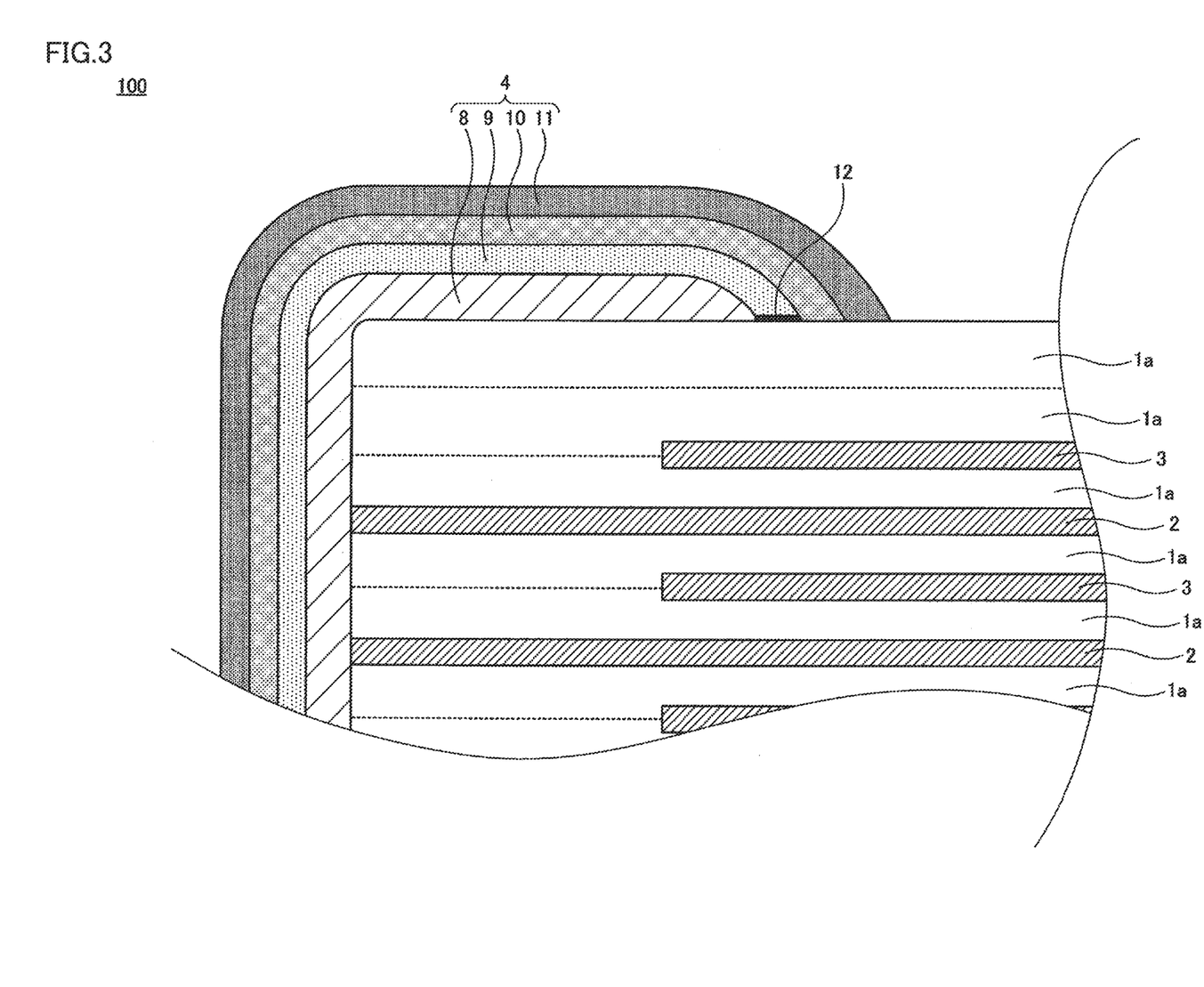
FIG. 3 is a sectional view of multilayer ceramic capacitor 100.
Figure 4:
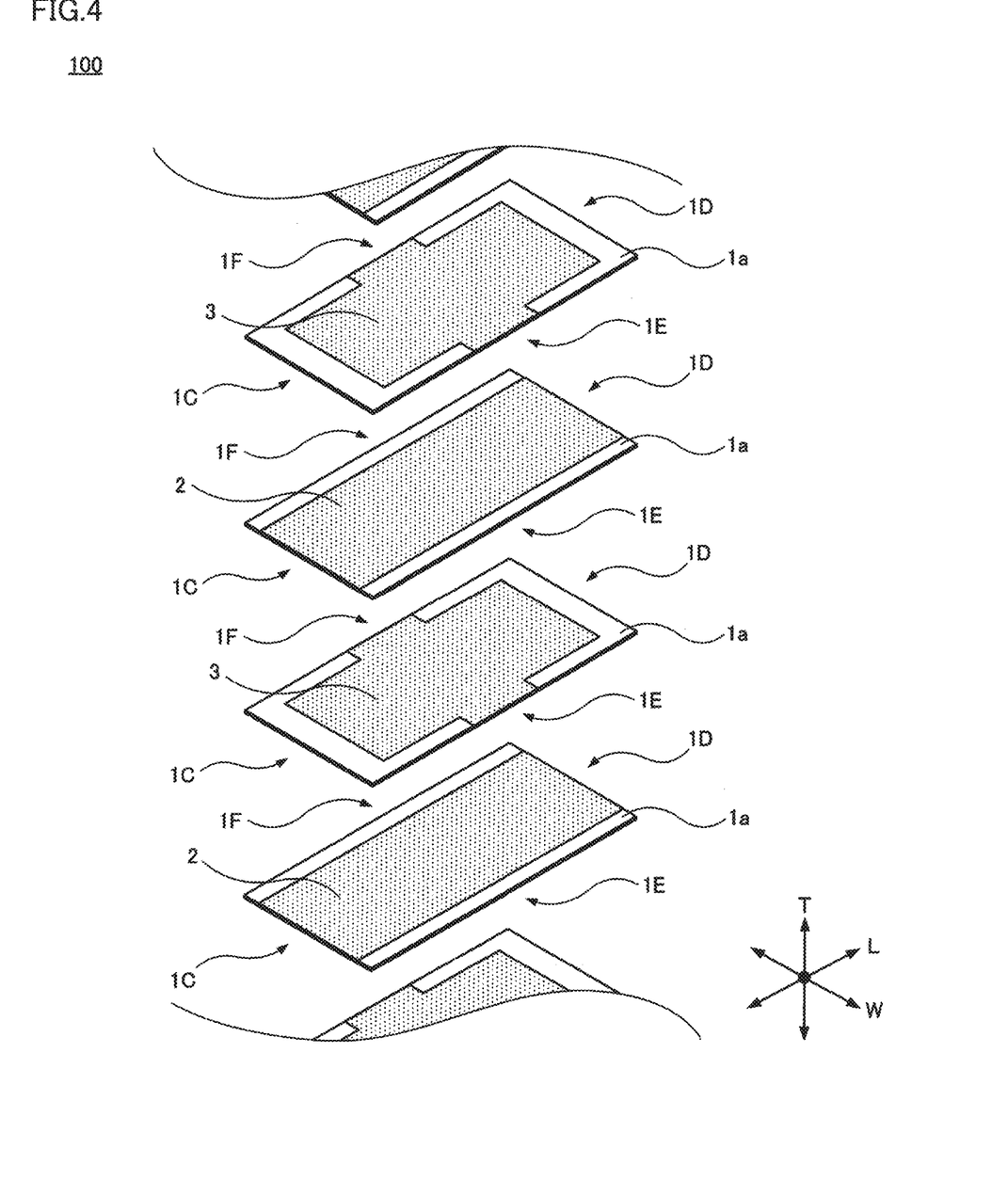
FIG. 4 is an exploded perspective view of multilayer ceramic capacitor 100.

FIGS. 1 to 4 show a multilayer ceramic capacitor 100 according to a first preferred embodiment of the present invention. FIG. 1 is a perspective view of multilayer ceramic capacitor 100. FIG. 2 is a sectional view of multilayer ceramic capacitor 100 along the dash-dot arrow, II-II, in FIG. 1. FIG. 3 is a sectional view of a main portion of multilayer ceramic capacitor 100. FIG. 4 is an exploded perspective view of multilayer ceramic capacitor 100. These drawings include a height direction T, a length direction L, and a width direction W of multilayer ceramic capacitor 100, which may be mentioned in the description below. With respect to the present preferred embodiment, the direction in which ceramic layers 1a are stacked is defined as height direction T of multilayer ceramic capacitor 100.

Multilayer ceramic capacitor 100 includes a capacitive element 1 having a rectangular or substantially rectangular parallelepiped shape. Capacitive element 1 includes a pair of main surfaces 1A, 1B facing each other in height direction T, a pair of end surfaces 1C, 1D facing each other in length direction L orthogonal or substantially orthogonal to height direction T, and a pair of side surfaces 1E, 1F facing each other in width direction W orthogonal or substantially orthogonal to both height direction T and length direction L.

The dimensions of multilayer ceramic capacitor 100 are not limited. The dimension in height direction T may preferably range from about 0.1 mm to about 2.5 mm, for example. The dimension in length direction L may preferably range from about 0.1 mm to about 3.2 mm, for example. The dimension in width direction W may preferably range from about 0.1 mm to about 2.5 mm, for example.

Capacitive element 1 includes a stack of a plurality of ceramic layers 1a and a plurality of internal electrodes 2, 3. Internal electrodes 2 correspond to first internal electrodes, and internal electrodes 3 correspond to second internal electrodes.

The material of capacitive element 1 (ceramic layers 1a) is not limited. For example, a dielectric ceramic mainly including $BaTiO_3$ may be used. A dielectric ceramic mainly including a substance other than $BaTiO_3$, such as $CaTiO_3$, $SrTiO_3$, or $CaZrO_3$ may also be used.

The thickness of each ceramic layer 1a is not limited. In a capacitance-contributing effective region in which internal electrodes 2, 3 are provided, the thickness may preferably range from about 0.3 μm to about 2.0 μm, for example.

The number of ceramic layers 1a is not limited. The number of ceramic layers 1a in the capacitance-contributing effective region, in which internal electrodes 2, 3 are provided, may preferably range from 1 to 6000, for example.

On each of the upper and lower sides of capacitive element 1, an outer layer (protective layer) is provided that solely includes ceramic layer 1a with no internal electrode 2, 3. The thickness of the outer layer is not limited and may preferably range from about 15 μm to about 150 μm, for example. The thickness of each ceramic layer 1a in the outer layer region may be greater than the thickness of each ceramic layer 1a in the capacitance-contributing effective region in which internal electrodes 2, 3 are provided (although, in FIGS. 2 and 3, the thickness of each ceramic layer 1a in the outer layer region is the same or substantially the same as that in the effective region). The material of ceramic layers 1a in the outer layer region may be different from the material of ceramic layers 1a in the effective region.

FIG. 4 is an exploded perspective view showing the middle section of capacitive element 1 in height direction T and the vicinity, with ceramic layers 1a being shown apart from each other. As seen in FIG. 4, each internal electrode 2 extends in length direction L of multilayer ceramic capacitor 100 to both end surfaces 1C, 1D of capacitive element 1, and each internal electrode 3 extends in length direction L of multilayer ceramic capacitor 100 to both side surfaces 1E, 1F of capacitive element 1. In principle, internal electrodes 2 and internal electrodes 3 are alternately stacked.

Internal electrodes 2, 3 may mainly include any suitable material. In the present preferred embodiment, Ni is preferably used, for example. Instead of Ni, other metals such as Cu, Ag, Pd, and/or Au, for example, may be used. These metals such as Ni, Cu, Ag, Pd, and Au may be in an alloy including other metals.

The thickness of each internal electrode 2, 3 is not limited and may preferably range from about 0.3 µm to about 1.5 µm, for example.

The size of the gap between internal electrodes 2, 3 and side surfaces 1E, 1F of capacitive element 1 is not limited and may preferably range from about 10 µm to about 200 µm, for example. The size of the gap between internal electrodes 3 and end surfaces 1C, 1D of capacitive element 1 is not limited and may preferably range from about 0.5 µm to about 300 µm, for example.

On the surface of capacitive element 1, external electrodes 4, 5, 6, 7 are provided.

External electrode 4 is provided on end surface 1C of capacitive element 1. External electrode 4 preferably has a cap shape, with an edge portion extending from end surface 1C onto main surfaces 1A, 1B and side surfaces 1E, 1F of capacitive element 1.

External electrode 5 is provided on end surface 1D of capacitive element 1. External electrode 5 preferably has a cap shape, with an edge portion extending from end surface 1D onto main surfaces 1A, 1B and side surfaces 1E, 1F of capacitive element 1.

External electrode 6 is provided on side surface 1E of capacitive element 1. External electrode 6 preferably has a C shape, with an edge portion extending from side surface 1E onto main surfaces 1A, 1B of capacitive element 1.

External electrode 7 is provided on side surface 1F of capacitive element 1. External electrode 7 preferably has a C shape, with an edge portion extending from side surface 1F onto main surfaces 1A, 1B of capacitive element 1.

In multilayer ceramic capacitor 100, internal electrode 2 extends to end surface 1C of capacitive element 1, where it is connected to external electrode 4; internal electrode 2 extends to end surface 1D of capacitive element 1, where it is connected to external electrode 5; internal electrode 3 extends to side surface 1E of capacitive element 1, where it is connected to external electrode 6; and internal electrode 3 extends to side surface 1F of capacitive element 1, where it is connected to external electrode 7.

With the configuration in which internal electrode 2 is connected to external electrodes 4, 5 and internal electrode 3 is connected to external electrodes 6, 7, multilayer ceramic capacitor 100 may be used as a three-terminal capacitor. More specifically, multilayer ceramic capacitor 100 may be used as a three-terminal capacitor with the following circuit configuration: a power-supply line or a signal line is cut at a midpoint; one of the cut ends is connected to external electrode 4 and the other is connected to external electrode 5; and external electrodes 6, 7 are grounded. In this configuration, internal electrode 2 defines and functions as a through electrode and internal electrode 3 defines and functions as a ground electrode.

External electrodes 4 to 7 preferably have the same or substantially the same multilayer structure. More specifically, as shown in FIGS. 2 and 3, each of external electrodes 4 to 7 includes a base electrode layer 8 provided on a surface of capacitive element 1, a Cu-plated electrode layer 9 provided on a surface of base electrode layer 8 and including an edge portion facing the surface of capacitive element 1, a Ni-plated electrode layer 10 provided on a surface of Cu-plated electrode layer 9 and including an edge portion facing the surface of capacitive element 1, and an Sn-plated electrode layer 11 provided on a surface of Ni-plated electrode layer 10 and including an edge portion facing the surface of capacitive element 1.

Base electrode layer 8 is a base part of each of external electrodes 4 to 7. The main function of Cu-plated electrode layer 9 is to improve moisture resistance. The main function of Ni-plated electrode layer 10 is to improve resistance to soldering heat and to improve joining properties. The main function of Sn-plated electrode layer 11 is to improve solderability.

With respect to the present preferred embodiment, base electrode layer 8 preferably mainly includes Ni, for example. However, base electrode layer 8 may mainly include any material, and, for example, may mainly include Cu, Ag, or the like instead of Ni. These metals such as Ni, Cu, and Ag may be an alloy including other metals.

The thickness of base electrode layer 8 is not limited and may preferably range from about 5 µm to about 150 µm, for example.

The thickness of Cu-plated electrode layer 9 is not limited and may preferably range from about 3 µm to about 20 µm, for example.

The surface roughness, RA, of Cu-plated electrode layer 9 is not limited and may preferably range from about 0.1 µm to about 1.0 µm, for example.

With respect to the present preferred embodiment, a set of two layers, Ni-plated electrode layer 10 and Sn-plated electrode layer 11, corresponds to a second plated electrode layer provided on the surface of Cu-plated electrode layer 9. However, the number of layers of the second plated electrode layer is not limited. Instead of two, the number of layers may be one or may be three or more. The material of each layer of the second plated electrode layer is not limited. The second plated electrode layer may include a plated electrode layer including a metal other than Ni or Sn.

The thickness of Ni-plated electrode layer 10 is not limited and may preferably range from about 2 µm to about 7 µm, for example.

The thickness of Sn-plated electrode layer 11 is not limited and may preferably range from about 1 µm to about 8 µm, for example.

Each of Cu-plated electrode layer 9, Ni-plated electrode layer 10, and Sn-plated electrode layer 11 may include impurities. Each of Cu-plated electrode layer 9, Ni-plated electrode layer 10, and Sn-plated electrode layer 11 may be an alloy.

In multilayer ceramic capacitor 100, Sn 12 is provided between the edge portion of Cu-plated electrode layer 9 and the surface of capacitive element 1. When Sn 12 is provided, it means that Wavelength-Dispersive X-ray spectrometry (WDX) analysis of a cross section of external electrodes 4 to 7 detects Sn between the edge portion of Cu-plated electrode layer 9 and the surface of capacitive element 1, regardless of the state of the Sn.

In multilayer ceramic capacitor 100, Sn 12 is provided between the edge portion of Cu-plated electrode layer 9 and the surface of capacitive element 1, which is where moisture tends to penetrates through, and therefore, moisture resistance is improved. This is explained below in more detail.

Cu-plated electrode layer 9 is formed on the surface of base electrode layer 8 by plating growth, and, therefore, the edge portion of Cu-plated electrode layer 9 is merely in contact with the surface of the capacitive element, not strongly joined to the surface of capacitive element 1. Because of this, when Cu-plated electrode layer 9 is thin, for example, moisture can penetrate from outside through a gap between the edge portion of Cu-plated electrode layer 9 and the surface of capacitive element 1 into external electrodes 4, 5, 6, 7.

In multilayer ceramic capacitor 100, Sn 12 is provided between the edge portion of Cu-plated electrode layer 9 and the surface of capacitive element 1, and thus, moisture penetration through the gap between the edge portion of Cu-plated electrode layer 9 and the surface of capacitive element 1 into external electrodes 4 to 7 is reduced or prevented. Although the detailed mechanism is under investigation, having Sn 12 between the edge portion of Cu-plated electrode layer 9 and the surface of capacitive element 1 makes it possible to reduce or prevent moisture penetration through this section.

Humidity Load Test

The effectiveness of preferred embodiments of the present invention was checked by a humidity load test described below.

First, multilayer ceramic capacitor 100 according to the first preferred embodiment was produced for use as an Example sample.

For the sake of comparison, another multilayer ceramic capacitor was produced for use as a Comparative Example sample, which had a configuration partially different from that of multilayer ceramic capacitor 100. More specifically, multilayer ceramic capacitor 100 included Sn 12 between the edge portion of Cu-plated electrode layer 9 and the surface of capacitive element 1, whereas the multilayer ceramic capacitor of Comparative Example did not include Sn 12 between the edge portion of Cu-plated electrode layer 9 and the surface of capacitive element 1 (in the production, the step for including Sn 12 was not performed). Other than this, the configuration of the multilayer ceramic capacitor of Comparative Example was the same or substantially the same as that of multilayer ceramic capacitor 100.

Ten Example samples and ten Comparative Example samples were produced, and each was mounted on a glass-epoxy substrate with eutectic solder. Then, insulation resistance of each sample was measured.

Subsequently, the glass-epoxy substrate was placed in a high-temperature high-humidity bath, followed by application of a voltage of about 3.2 V to the sample for about 72 hours in an environment of about 125° C. and a relative humidity of about 95% RH. After the humidity load test, insulation resistance of the sample was measured.

A sample was rated as defective when it showed a decrease in insulation resistance by one or more orders of magnitude before and after the humidity load test. One out of ten Example samples was rated as defective, whereas ten out of ten Comparative Example samples were rated as defective.

By this humidity load test, the effectiveness of preferred embodiments of the present invention was checked and confirmed.

Example Method of Manufacturing Multilayer Ceramic Capacitor 100

A non-limiting example method of manufacturing multilayer ceramic capacitor 100 according to the first preferred embodiment will be described referring to FIGS. 5A to 7F.

Figure 5A:
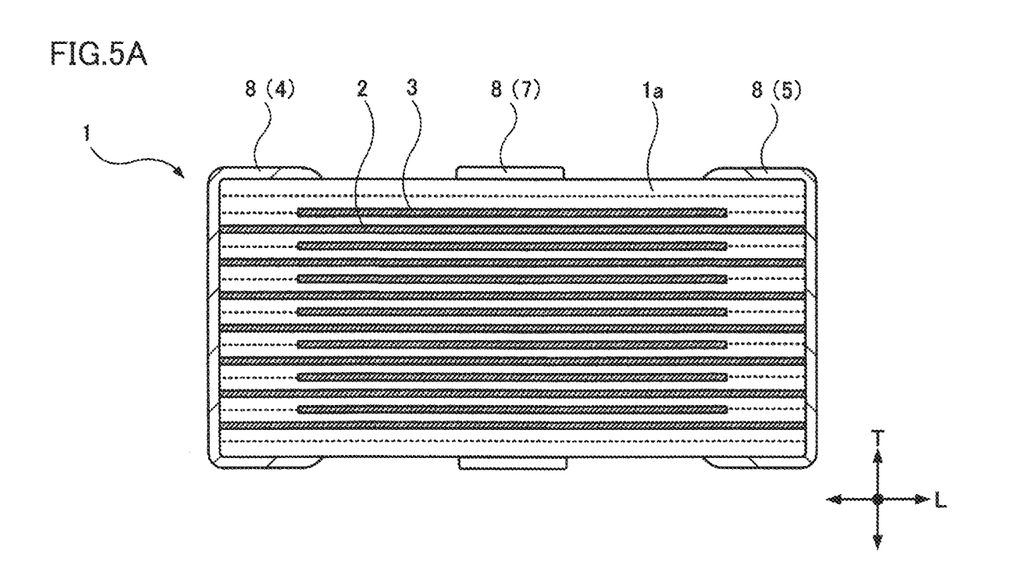
FIG. 5A is a sectional view showing a step in an example method of manufacturing multilayer ceramic capacitor 100.

First, capacitive element 1 shown in FIG. 5A is produced, which includes internal electrodes 2, 3 formed inside and base electrode layers 8 of external electrodes 4 to 7 formed on a surface thereof.

Dielectric ceramic powder, binder resin, solvent, and the like are prepared and wet mixed to produce ceramic slurry (not shown in the drawings).

The resulting ceramic slurry is applied to a carrier film with a die coater, a gravure coater, a microgravure coater, and/or the like, for example, to form sheets, which are dried to produce ceramic green sheets.

To main surfaces of predetermined ceramic green sheets thus produced, a conductive paste prepared in advance for forming internal electrodes 2, 3 is applied in a desired pattern (by printing, for example). To other ceramic green sheets that are to become outer layers, no conductive paste is applied. The conductive paste may be a mixture of solvent, binder resin, and metal powder (such as Ni powder), for example.

The resulting ceramic green sheets are stacked in a predetermined order, followed by thermocompression bonding to produce an unfired capacitive element as a single body.

To a surface of the resulting unfired capacitive element, a conductive paste is applied in a desired shape for forming base electrode layer 8. The conductive paste may be a mixture of solvent, binder resin, metal powder (such as Ni powder), and ceramic powder, for example.

The resulting unfired capacitive element is fired under a predetermined profile to complete production of capacitive element 1 shown in FIG. 5A, with the ceramic green sheets fired to become ceramic layers 1a, the conductive paste applied to the main surfaces of ceramic green sheets fired at the same time to become internal electrodes 2, 3, and the conductive paste applied to the surface of the unfired capacitive element fired at the same time to become base electrode layers 8.

Figure 5B:
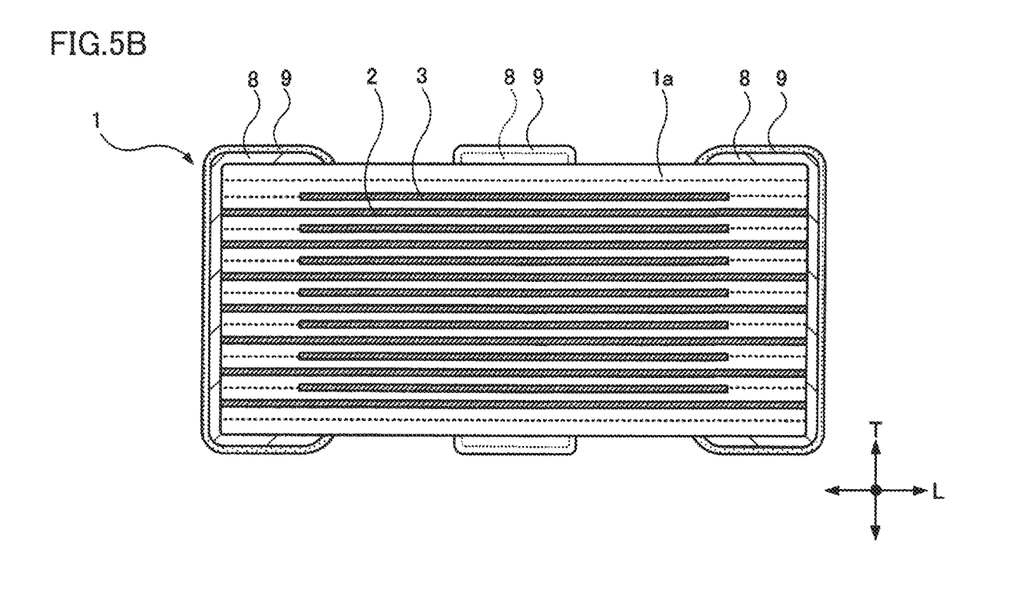
FIG. 5B is a sectional view showing a step in the example method of manufacturing multilayer ceramic capacitor 100.

Then, as shown in FIG. 5B, Cu-plated electrode layer 9 is formed on the surface of base electrode layer 8 of each of external electrodes 4 to 7.

Figure 6C:
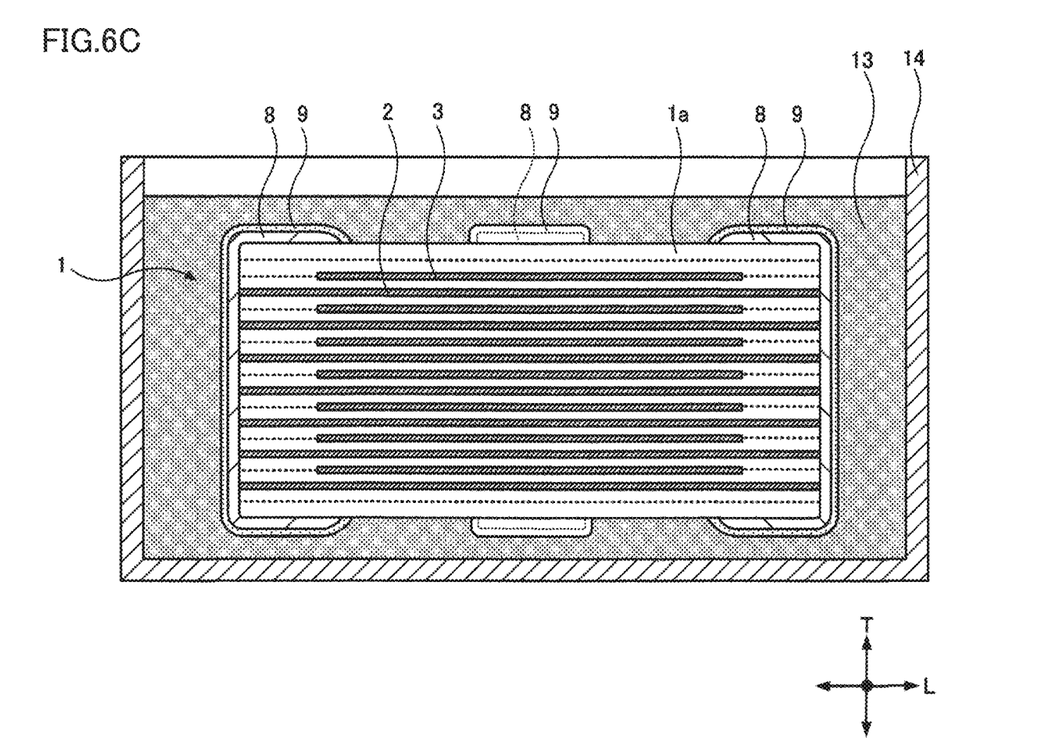
FIG. 6C is a sectional view showing a step subsequent to the step of FIG. 5B in the example method of manufacturing multilayer ceramic capacitor 100.

Then, as shown in FIG. 6C, a bath 14 including an Sn solution 13 is prepared and capacitive element 1 is immersed in solution 13. For example, solution 13 may preferably be an aqueous tin chloride solution containing divalent Sn. Preferably, solution 13 includes a surfactant. As the surfactant, an anti-pitting agent effective in reducing surface tension may be used; for example, sodium lauryl sulfate may preferably be used. This step is for impregnating Sn 12 between (in the gap between) the edge portion of Cu-plated electrode layer 9 and the surface of capacitive element 1, and a surfactant if included in solution 13 facilitates this process. Solution 13 may include other metals. With respect to immersing capacitive element 1 in solution 13, many capacitive elements 1 may be placed in one basket or the like and immersed at one time. Bath 14 may be airtight, and capacitive element 1 may be immersed in solution 13 in the bath 14, followed by air removal from bath 14 to produce a vacuum or a reduced pressure in bath 14.

Then, capacitive element 1 is removed from solution 13. Residual Sn adhered to the surface of capacitive element 1 and/or the surface of base electrode layer 8 may be removed. The Sn removal from the surface may be performed by physical grinding (barrel grinding, UV irradiation, plasma irradiation) and/or chemical grinding (cleaning with alkali liquid, acid liquid, and/or the like), for example.

Figure 6D:
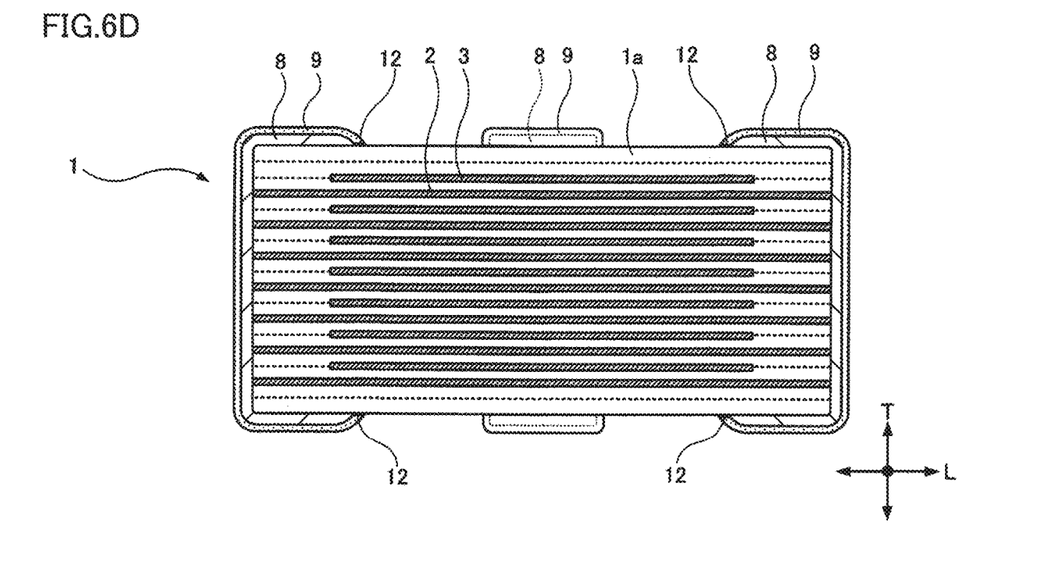
FIG. 6D is a sectional view showing a step subsequent to the step of FIG. 6C in the example method of manufacturing multilayer ceramic capacitor 100.

Thus, as shown in FIG. 6D, Sn 12 is impregnated between (in the gap between) the edge portion of Cu-plated electrode layer 9 and the surface of capacitive element 1.

Figure 7E:
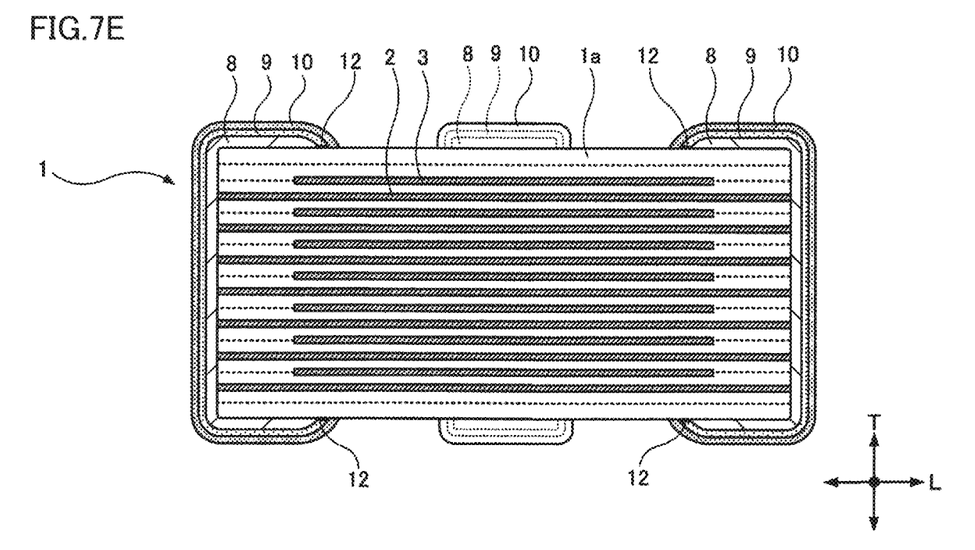
FIG. 7E is a sectional view showing a step subsequent to the step of FIG. 6D in the example method of manufacturing multilayer ceramic capacitor 100.

Then, as shown in FIG. 7E, Ni-plated electrode layer 10 is formed on the surface of Cu-plated electrode layer 9 of each of external electrodes 4 to 7. When solder balls are used as media at the time of forming Ni-plated electrode layer 10, an Sn layer may be formed at the interface between Cu-plated electrode layer 9 and Ni-plated electrode layer 10.

Figure 7F:
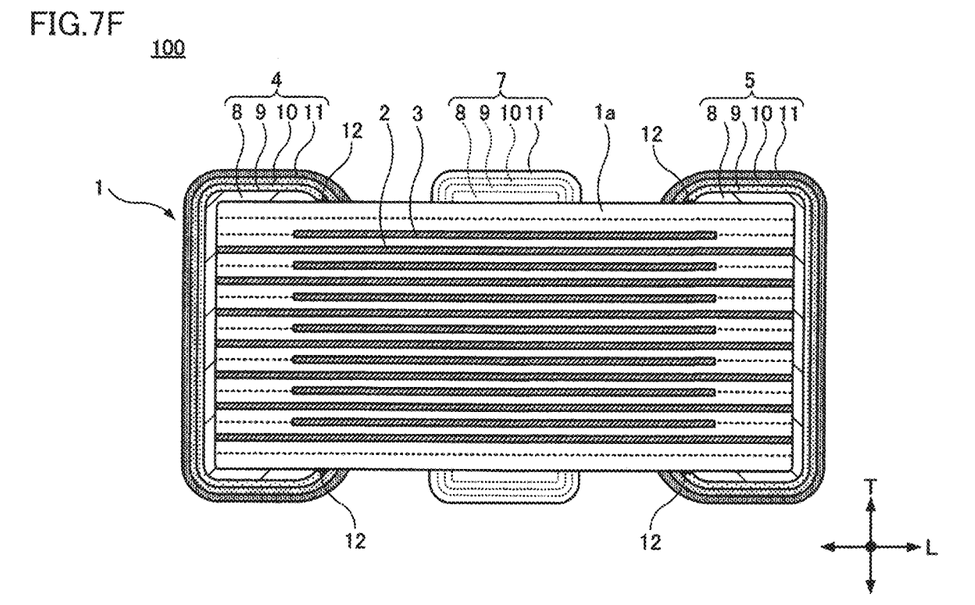
FIG. 7F is a sectional view showing a step subsequent to the step of FIG. 7E in the example method of manufacturing multilayer ceramic capacitor 100.

Lastly, as shown in FIG. 7E, Sn-plated electrode layer 11 is formed on the surface of Ni-plated electrode layer 10 to complete production of external electrodes 4 to 7, thus completing production of multilayer ceramic capacitor 100 according to the first preferred embodiment.

Although a surfactant may be mixed in the plating solution used for forming Sn-plated electrode layer 11, multilayer ceramic capacitor 100 has a configuration in which Sn 12 is provided between the edge portion of Cu-plated electrode layer 9 and the surface of capacitive element 1, and thus, penetration of the plating solution (moisture) into external electrodes 4 to 7 is reduced or prevented. As a result, the plating solution reaching internal electrodes 2, 3 is also reduced or prevented and, consequently, degradation of properties of multilayer ceramic capacitor 100 due to the plating solution is also reduced or prevented.

Second Preferred Embodiment

Figure 8:
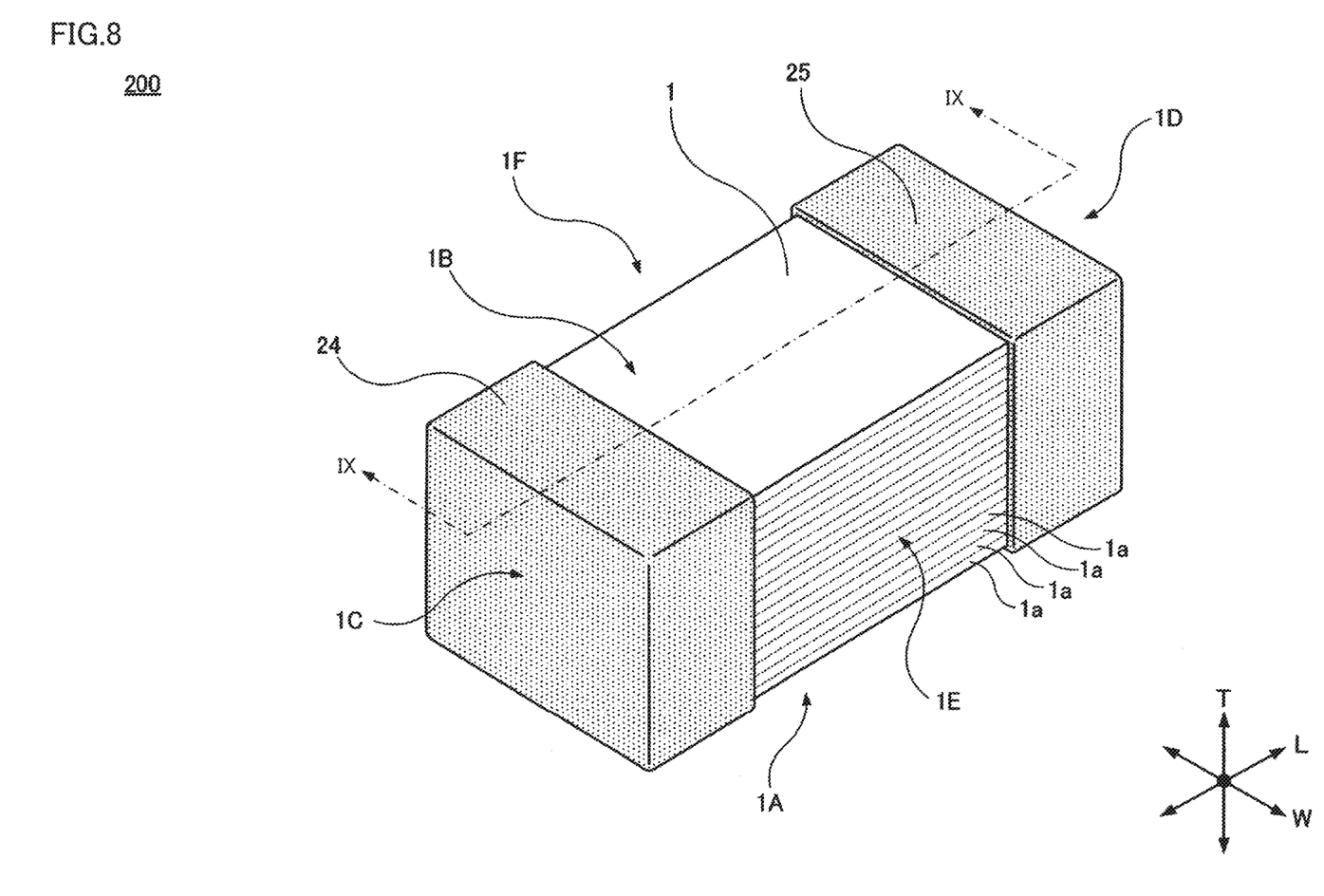
FIG. 8 is a perspective view of a multilayer ceramic capacitor 200 according to a second preferred embodiment of the present invention.
Figure 9:
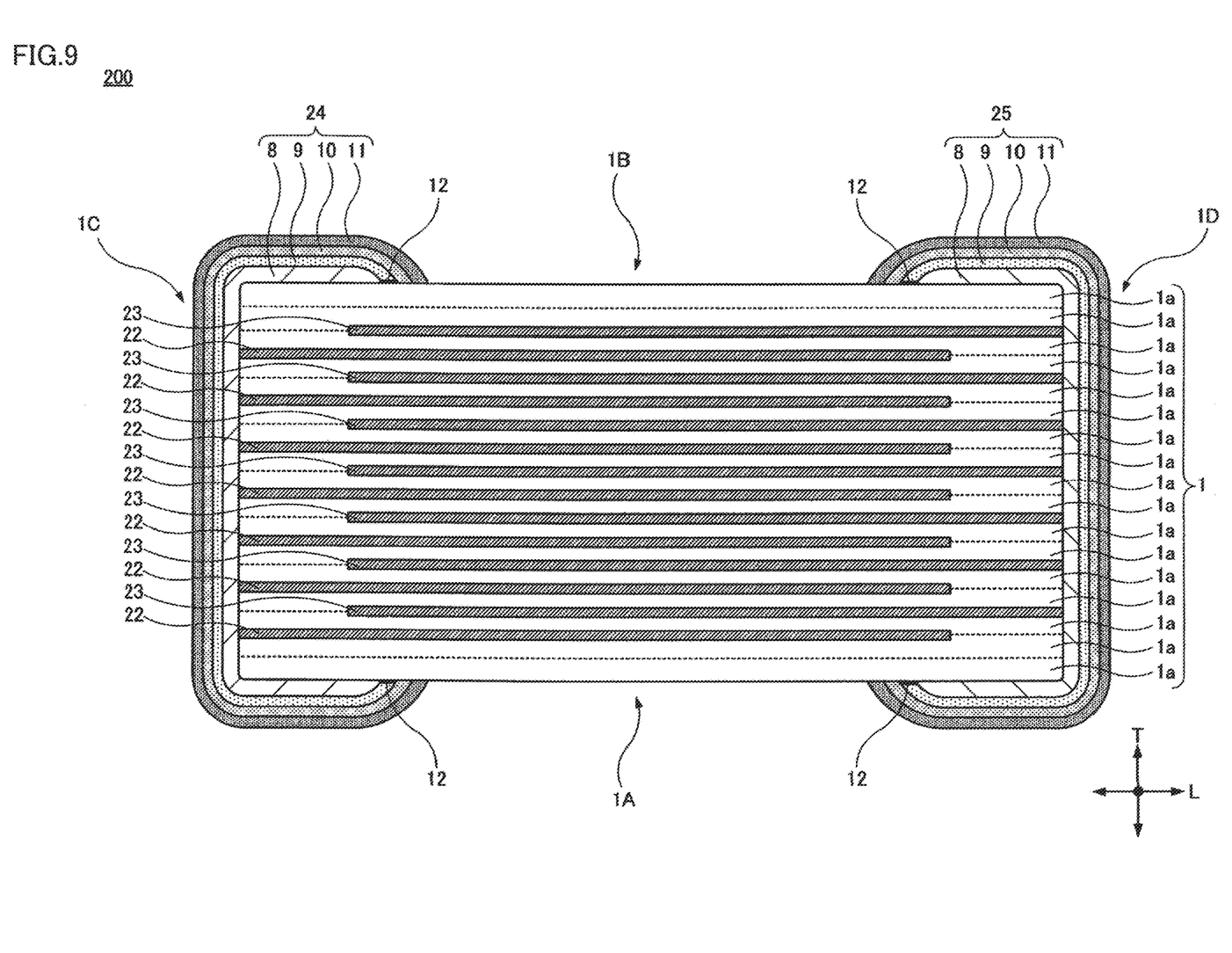
FIG. 9 is a sectional view of multilayer ceramic capacitor 200.

FIGS. 8 and 9 show a multilayer ceramic capacitor 200 according to a second preferred embodiment of the present invention. FIG. 8 is a perspective view of multilayer ceramic capacitor 200. FIG. 9 is a sectional view of multilayer ceramic capacitor 200 along the dash-dot arrow, IX-IX, in FIG. 8.

Multilayer ceramic capacitor 200 according to the second preferred embodiment has a configuration that is partially different from that of multilayer ceramic capacitor 100 according to the first preferred embodiment. More specifically, multilayer ceramic capacitor 100 is a three-terminal capacitor, whereas multilayer ceramic capacitor 200 is a two-terminal capacitor.

Multilayer ceramic capacitor 200 includes capacitive element 1 including a stack of a plurality of ceramic layers 1a and a plurality of internal electrodes 22, 23. Both internal electrodes 22, 23 extend in length direction L and are rectangular or substantially rectangular in the plan view. Internal electrodes 22 extend to end surface 1C of capacitive element 1, and internal electrodes 23 extend to end surface 1D of capacitive element 1.

On the surface of capacitive element 1, external electrodes 24, 25 are provided.

External electrode 24 is provided on end surface 1C of capacitive element 1. External electrode 24 preferably has a cap shape, with an edge portion extending from end surface 1C onto main surfaces 1A, 1B and side surfaces 1E, 1F of capacitive element 1.

External electrode 25 is provided on end surface 1D of capacitive element 1. External electrode 25 preferably has a cap shape, with an edge portion extending from end surface 1D onto main surfaces 1A, 1B and side surfaces 1E, 1F of capacitive element 1.

In multilayer ceramic capacitor 200, internal electrode 22 extends to end surface 1C of capacitive element 1, where it is connected to external electrode 24; and internal electrode 23 extends to end surface 1D of capacitive element 1, where it is connected to external electrode 25.

Each of external electrodes 24, 25 includes base electrode layer 8 provided on the surface of capacitive element 1, Cu-plated electrode layer 9 provided on the surface of base electrode layer 8 and including an edge portion facing the surface of capacitive element 1, Ni-plated electrode layer 10 provided on the surface of Cu-plated electrode layer 9 and including an edge portion facing the surface of capacitive element 1, and Sn-plated electrode layer 11 provided on the surface of Ni-plated electrode layer 10 and including an edge portion facing the surface of capacitive element 1.

Also in multilayer ceramic capacitor 200, Sn 12 is provided between the edge portion of Cu-plated electrode layer 9 and the surface of capacitive element 1.

In multilayer ceramic capacitor 200, Sn 12 is provided between the edge portion of Cu-plated electrode layer 9 and the surface of capacitive element 1, which is where moisture tends to penetrates through, and therefore, moisture resistance is improved.

In this way, the multilayer ceramic capacitor according to a preferred embodiment of the present invention may be configured as a two-terminal capacitor.

Third Preferred Embodiment

Steps of a third preferred embodiment of the present invention are partially different from those of the method of manufacturing multilayer ceramic capacitor 100 described in the section for the first preferred embodiment. It should be noted that the structure of multilayer ceramic capacitor 100 manufactured according to the third preferred embodiment is the same or substantially the same as that of the first preferred embodiment, and therefore no drawing is provided.

In the method of manufacturing multilayer ceramic capacitor 100 according to the first preferred embodiment, an unfired capacitive element is produced; to a surface of the resulting unfired capacitive element, a conductive paste is applied in a desired shape; and, when the resulting unfired capacitive element is fired to produce capacitive element 1, the conductive paste applied to the surface of the unfired capacitive element is fired at the same time to form base electrode layer 8. The third preferred embodiment is different in these respects. In the third preferred embodiment, a conductive paste is not applied to a surface of the unfired capacitive element; after the unfired capacitive element is fired to produce capacitive element 1, a conductive paste is applied in a desired shape to the surface of capacitive element 1; and then capacitive element 1 is heated to bake the conductive paste on the surface of capacitive element 1, and thus base electrode layer 8 is formed. The other steps of the third preferred embodiment are the same or substantially the same as those of the first preferred embodiment. In this way, base electrode layer 8 may be formed after firing the unfired capacitive element and producing capacitive element 1.

The first preferred embodiment, the second preferred embodiment, and the third preferred embodiment have been described. However, the scope of the present invention is not limited to the above-described preferred embodiments, and various changes may be made according to the spirit and scope of the present invention.

For instance, in multilayer ceramic capacitors 100, 200, Sn 12 is provided between the edge portion of Cu-plated electrode layer 9 and the surface of capacitive element 1, whereas, at this location, a metal other than Sn may also be provided.

Moreover, in multilayer ceramic capacitors 100, 200, two layers (Ni-plated electrode layer 10 and Sn-plated electrode layer 11) are provided as a second plated layer, whereas the number, the material, and/or the like of the layers of the second plated layer are not limited and may be changed as appropriate.

Moreover, in multilayer ceramic capacitor 100, two electrodes (external electrodes 6, 7) are provided for grounding in order to define a three-terminal capacitor, whereas external electrode 6 and external electrode 7 may be connected to each other on the surface of capacitive element 1 to define a single common external electrode. In the latter case, although it is preferable that internal electrode 3 is connected to the common external electrode on both side surfaces 1E, 1F of capacitive element 1, electric connection is established as long as internal electrode 3 is connected to the common external electrode on at least one of side surfaces 1E, 1F.

In a multilayer ceramic capacitor according to a preferred embodiment of the present invention, it is also preferable that the base electrode layer mainly includes Ni. In this case, by forming the internal electrodes to be mainly including Ni (or mainly including a metal that withstands firing at high temperatures), it may be easy to fire the capacitive element, the internal electrodes, and the base electrode layer of the external electrode at the same time.

Moreover, it is also preferable that at least one second plated electrode layer provided on a surface of the Cu-plated electrode layer and including an edge portion facing the surface of the capacitive element is further included.

Further, it is also preferable that the second plated electrode layer includes an Sn-plated electrode layer. In this case, solderability of the external electrode may be improved.

Further, it is also preferable that the second plated electrode layer includes a Ni-plated electrode layer on the surface of the Cu-plated electrode layer and the Sn-plated electrode layer on a surface of the Ni-plated electrode layer. In this case, resistance to soldering heat may be improved, joining properties may be improved by the Ni-plated electrode layer, and solderability may be improved by the Sn-plated electrode layer.

Further, it is also preferable that a three-terminal capacitor has the following configuration: the internal electrodes include at least one first internal electrode and at least one second internal electrode; the at least one first internal electrode extends to the surface of the capacitive element at both the end surfaces and is connected to two of the external electrodes; and the at least one second internal electrode extends to the surface of the capacitive element at at least one of the side surfaces and is connected to the external electrode.

In a non-limiting example of a method of manufacturing a multilayer ceramic capacitor according to a preferred embodiment of the present invention, it is also preferable that the forming a base electrode layer on a surface of the capacitive element includes applying a conductive paste for forming the base electrode layer to a surface of the unfired capacitive element in a desired shape, and the firing the unfired capacitive element to produce a capacitive element includes firing the conductive paste and the unfired capacitive element at the same time. In this case, it may be easy to form a base electrode layer.

Moreover, it is also preferable that the applying a conductive paste for forming the base electrode layer includes applying a Ni-containing conductive paste. In this case, by forming the internal electrodes to mainly include Ni (or mainly include a metal that withstands firing at high temperatures), it may be easy to fire the capacitive element, the internal electrodes, and the base electrode layer of the external electrode at the same time.

Further, after the immersing the capacitive element in an Sn solution, excess Sn may be removed from the surface of the capacitive element and/or the surface of the Cu-plated electrode layer. In this case, formation of a second plated electrode layer at an unwanted location due to the presence of excess Sn may be reduced or prevented. The Sn removal from the surface may be performed by physical grinding (barrel grinding, UV irradiation, plasma irradiation) and/or chemical grinding (cleaning with alkali liquid, acid liquid, and/or the like), for example.

Further, it is also preferable that the forming at least one second plated electrode layer includes forming an Sn-plated electrode layer. In this case, solderability of the external electrode may be improved.

Further, it is also preferable that the forming at least one second plated electrode layer includes: forming a Ni-plated electrode layer on the surface of the Cu-plated electrode layer; and forming the Sn-plated electrode layer on a surface of the Ni-plated electrode layer. In this case, resistance to soldering heat may be improved, joining properties may be improved by the Ni-plated electrode layer, and solderability may be improved by the Sn-plated electrode layer.

Further, it is also preferable that, in the immersing the capacitive element in an Sn solution to impregnate Sn at least between the edge portion of the Cu-plated electrode layer and the surface of the capacitive element, the capacitive element is immersed in an aqueous tin chloride solution including divalent Sn. In this case, it may be easy to impregnate Sn between the edge portion of the Cu-plated electrode layer and the surface of the capacitive element.

Further, it is also preferable that, in the immersing the capacitive element in an Sn solution to impregnate Sn at least between the edge portion of the Cu-plated electrode layer and the surface of the capacitive element, the capacitive element is immersed in an Sn solution including a surfactant. In this case, impregnating Sn between the edge portion of the Cu-plated electrode layer and the surface of the capacitive element may be achieved more effectively.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a capacitive element including a stack of a plurality of ceramic layers and a plurality of internal electrodes, and including an external surface including a pair of main surfaces facing each other in a height direction, a pair of end surfaces facing each other in a length direction orthogonal or substantially orthogonal to the height direction, and a pair of side surfaces facing each other in a width direction orthogonal or substantially orthogonal to both the height direction and the length direction; and
   at least two external electrodes on the external surface of the capacitive element; wherein
   each of the internal electrodes extends to the external surface of the capacitive element at the end surfaces and/or the side surfaces and is connected to at least one of the external electrodes;
   each of the external electrodes includes:

a base electrode layer on the external surface of the capacitive element; and a Cu-plated electrode layer on a surface of the base electrode layer and including an edge portion facing the external surface of the capacitive element;

Sn is provided between the edge portion of the Cu-plated electrode layer and the external surface of the capacitive element;

each of the base electrode layer, the Cu-plated electrode layer, and the Sn is disposed on a portion of at least one of the pair of main surfaces; and the base electrode layer extends continuously from at least one of the pair of end surfaces and the pair of side surfaces to at least one of the pair of main surfaces.

2. The multilayer ceramic capacitor according to claim 1, wherein the base electrode layer mainly includes Ni.

3. The multilayer ceramic capacitor according to claim 1, further comprising at least one second plated electrode layer provided on a surface of the Cu-plated electrode layer and including an edge portion facing the external surface of the capacitive element.

4. The multilayer ceramic capacitor according to claim 3, wherein the second plated electrode layer includes an Sn-plated electrode layer.

5. The multilayer ceramic capacitor according to claim 4, wherein the second plated electrode layer includes:
a Ni-plated electrode layer on the surface of the Cu-plated electrode layer; and
the Sn-plated electrode layer on a surface of the Ni-plated electrode layer.

6. The multilayer ceramic capacitor according to claim 1, wherein the multilayer ceramic capacitor is a three-terminal capacitor; wherein the internal electrodes include at least one first internal electrode and at least one second internal electrode;

the at least one first internal electrode extends to the external surface of the capacitive element at both of the end surfaces and is connected to two of the external electrodes; and the at least one second internal electrode extends to the external surface of the capacitive element at at least one of the side surfaces and is connected to at least one of the external electrodes.

7. The multilayer ceramic capacitor according to claim 1, wherein a dimension of the multilayer ceramic capacitor in the height direction is in a range from about 0.1 mm to about 2.5 mm;

a dimension of the multilayer ceramic capacitor in the length direction is in a range from about 0.1 mm to about 3.2 mm; and a dimension of the multilayer ceramic capacitor in the width direction is in a range from about 0.1 mm to about 2.5 mm.

8. The multilayer ceramic capacitor according to claim 1, wherein each of the ceramic layers mainly includes one of $BaTiO_3$, $CaTiO_3$, $SrTiO_3$, or $CaZrO_3$.

9. The multilayer ceramic capacitor according to claim 1, wherein a thickness of each of the ceramic layers is in a range from about 0.3 μm to about 2.0 μm.

10. The multilayer ceramic capacitor according to claim 1, wherein the internal electrodes include at least one of Ni, Cu, Ag, Pd, and Au.

11. The multilayer ceramic capacitor according to claim 1, wherein a thickness of each of the internal electrodes is in a range from about 0.3 μm to about 1.5 μm.

* * * * *